UNITED STATES PATENT OFFICE.

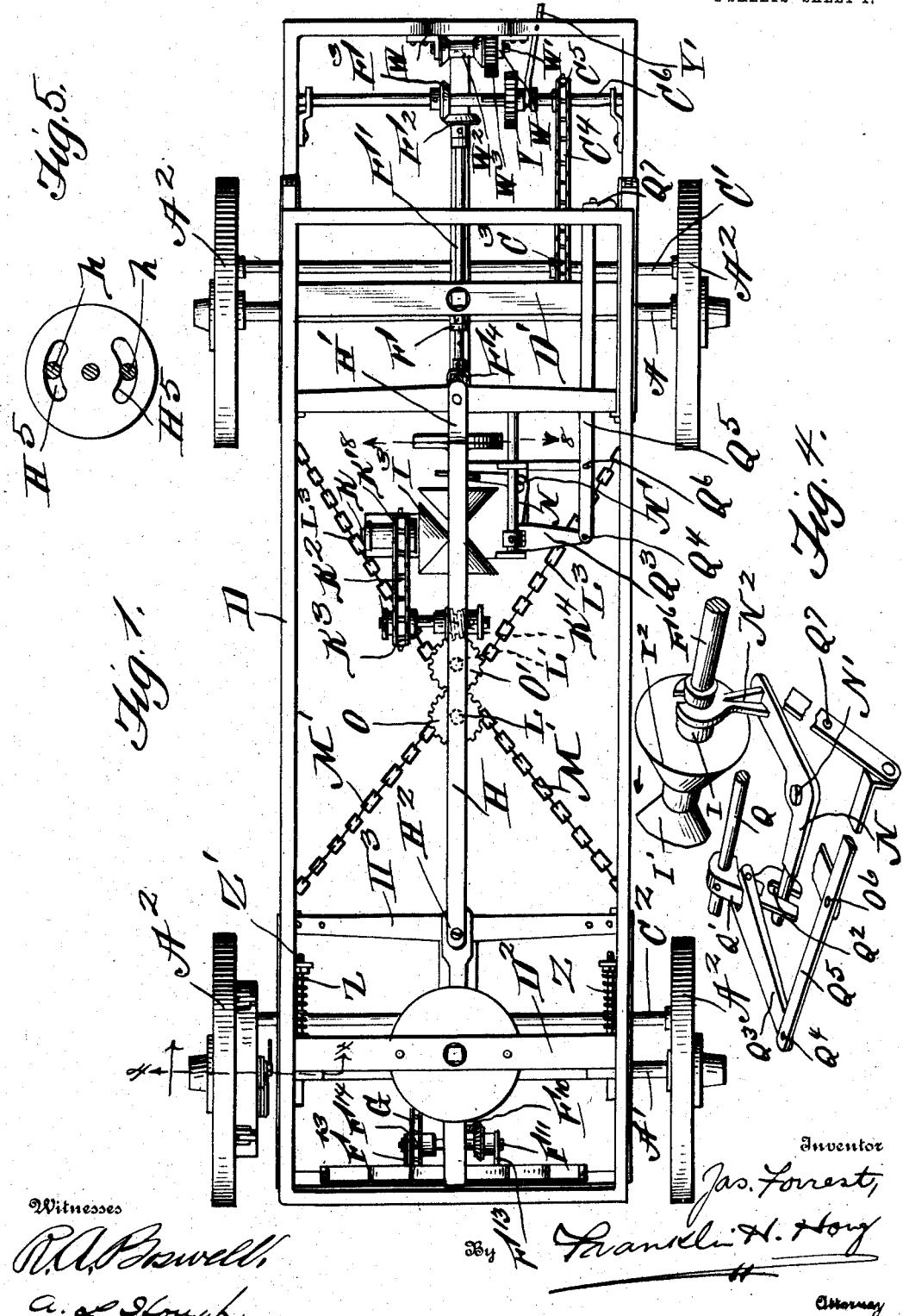

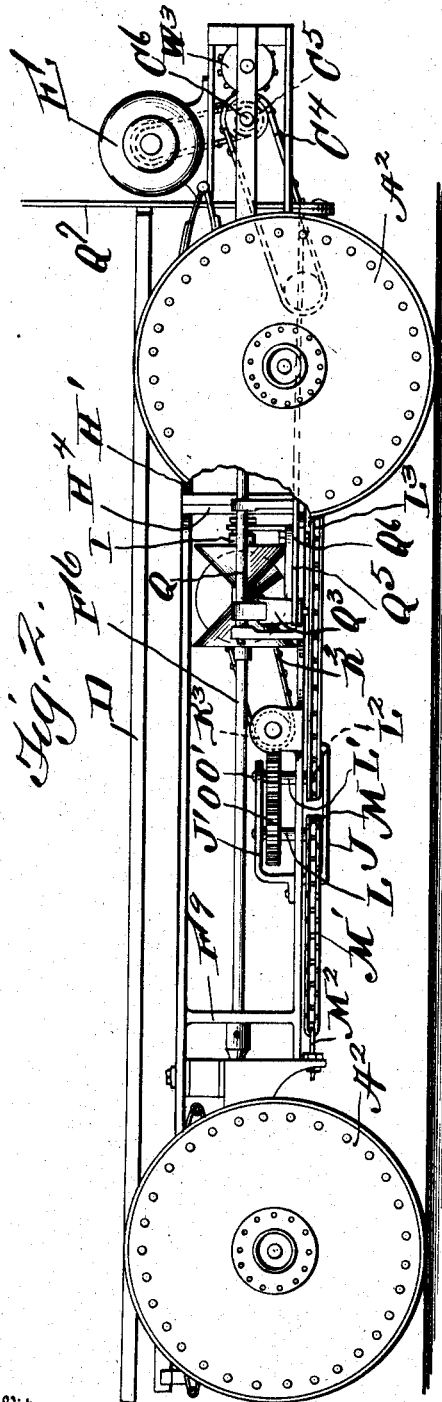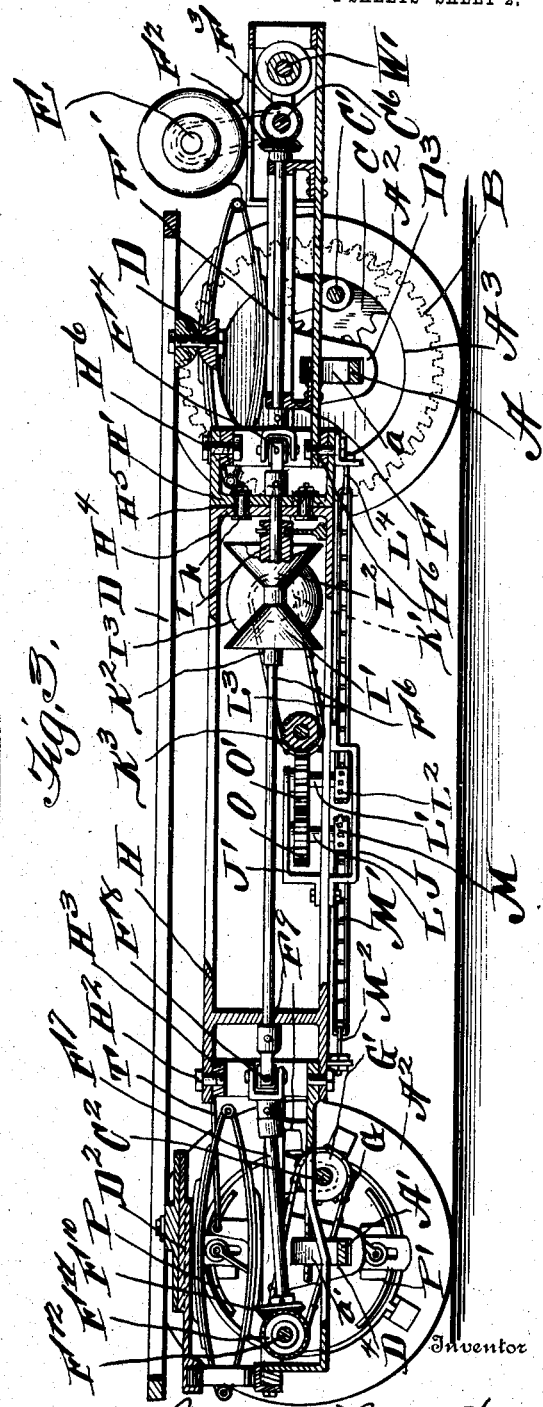

JAMES FORREST, OF SPOKANE, WASHINGTON.

MOTOR-VEHICLE.

No. 864,364.    Specification of Letters Patent.    Patented Aug. 27, 1907.

Application filed August 23, 1906. Serial No. 331,812.

*To all whom it may concern:*

Be it known that I, JAMES FORREST, a citizen of the United States, residing at Spokane, in the county of Spokane and State of Washington, have invented certain new and useful Improvements in Motor-Vehicle Apparatus; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in running gear for vehicles and especially for motor cars, and the object in view is to produce means whereby the weight coming upon the truck may be raised from the axles of the vehicle when extra power is being applied in the act of propelling the apparatus up grades, and comprises various details of construction and combinations and arrangements of parts which will be hereinafter fully described and then specifically defined in the appended claims.

I illustrate my invention in the accompanying drawings, in which:—

Figure 1 is a top plan view of my invention. Fig. 2 is a side elevation. Fig. 3 is a central longitudinal section vertically through the apparatus. Fig. 4 is a detail perspective view showing the means for shifting the steering apparatus, and Fig. 5 is a sectional view on line 8—8 of Fig. 1.

Reference now being had to the details of the drawings by letter, A and A' designate the front and rear axles, respectively, of the running gear and upon each of said axles are mounted the four driven wheels designated by letter $A^2$ of similar construction, each wheel being formed preferably of metal and hollow, with an opening $A^3$ upon its inner face, as shown clearly in Fig. 3 of the drawings. The bearing end of each axle is mounted in a suitable box $A^4$, shown in the sectional view, Fig. 4 of the drawings. Mounted within each hollow wheel is an annular rack gear B which teeth are engaged by the teeth of the gear wheels C, whereby a rotary movement may be imparted from the latter to said driven wheels, and thence to the shafts C' and $C^2$.

The framework of the running gear comprises a rack D upon which the body of the vehicle is adapted to rest, and a front bolster frame D' and the rear bolster frame $D^2$. The former of said bolster frames supports the forward end of said rack, suitable springs being interposed between the same, and projecting from the bottom of said frame D' are the plates $D^3$, shown in Figs. 3 and 4 of the drawings, which have elongated slots therein for the reception of the forward axle A. Rising from the upper edge of said axle A are the lugs $a$, between which the parallel portions of the frame D' are held, thereby preventing the same from moving toward or away from either of the front driven wheels.

It will be noted that a slight space intervenes between the opposite edges of the axle A, and the ends of the slot in said plate $D^3$, thereby allowing the front bolster frame a slight vertical movement independent of the axle A. The rear bolster frame $D^2$ is also provided with plates $D^4$ which are similar in construction to the plates $D^3$ before described, each of said plates $D^4$ being provided with an elongated vertically disposed slot to receive the rear axle A', a sufficient space intervening between the upper and lower edge of the axle which passes through said plates $A^4$ to allow the rear bolster frame to have a vertical movement independent of the rear axle. Lugs $a'$ project from the upper edge of the rear axle and between which the opposite parallel portions of the rear bolster frame are guided and held from lateral movement upon the axle.

Fixed to the shaft C' is a sprocket wheel $C^3$, shown clearly in Fig. 1 of the drawings, and about said sprocket wheel $C^3$, a sprocket chain $C^4$ travels and also about a second sprocket wheel $C^5$ which is fixed to the shaft $C^6$ which is journaled in suitable bearings upon the bolster frame D'.

A motor, designated in dotted lines by letter E, is adapted to be mounted upon the forward bolster frame and is provided with gear connections with the shaft $C^6$, whereby power may be applied for driving the vehicle. Mounted in suitable bearings F which are supported upon a central bar forming a part of the frame of the front bolster is a shaft F' having a bevel gear $F^2$ at its forward end which is in mesh with a bevel gear $F^3$ fixed to said shaft $C^6$, and the rear end of the shaft F' is connected by a universal knuckle joint $F^4$ with the forward end of the rod or shaft $F^5$. The rear end of the shaft $F^6$ is also connected to a shaft $F^7$ by a universal knuckle joint $F^8$, which is similar in construction to the knuckle joint $F^4$, before referred to. The shaft $F^7$ is mounted in suitable bearings $F^9$ carried by the rear bolster frame, and is provided with a bevel gear $F^{10}$ which is in mesh with a bevel gear $F^{11}$ mounted upon a shaft $F^{12}$ journaled in the bracket arms $F^{13}$ carried by the rear bolster frame. A sprocket wheel $F^{14}$ is fixed to the shaft $F^{12}$, and a sprocket chain G passes about the sprocket wheel $F^{14}$ and also about a sprocket wheel G' which is fixed to the shaft $C^2$, shown clearly in Fig. 3 of the drawings.

By the foregoing geared mechanism, it will be noted that power may be communicated to the four wheels having the annular gear rings mounted therein, the teeth of which are engaged by the said gear wheels C.

It will be noted upon reference to the drawings that the two shafts C' and $C^2$ to which the gear wheels C' and G² are fixed are mounted one in advance of each axle, and slightly above the lower marginal edge of each axle.

The two bolster frames referred to are connected together by means of the rectangular-outlined racks H and H', the rear end of said rack H being swivelly connected to the rear bolster by means of the screws H² which are fastened to the bowed cross-pieces H³ forming a part of the rear bolster. The forward end of the rack H is provided with an integral plate H⁴, a detail view of which is shown in Fig. 8 of the drawings, and has two oppositely disposed elongated slots H⁵ which are curved and through which the bolts h carried by the rack H' are adapted to pass. By this connection between the two racks, the forward one of which racks is pivotally mounted upon the pins H⁶, it will be noted that they have a tilting movement independent of the rack H and vice versa, whereby when one or the other of the front wheels of the vehicle strikes an obstruction, the forward bolster may be allowed to tilt up independent of the rear one, and in the event of either of the rear wheels passing over an obstruction, the rack H will tilt independent of the forward or front bolster.

Mounted to have a slight longitudinal movement upon the shaft F⁶ is a tubular shell I having the two friction cones I' and I² fixed thereto which are adapted to contact, one or the other, with an intermediate cone I³ which is mounted upon a shaft K, shown in Fig. 1 of the drawings, which shaft is journaled in bearings upon arms which project from the rack H, and a suitable sprocket wheel K' is fixed to the shaft K, and a chain K² passes about the sprocket wheel K' and also a sprocket wheel K³ fixed to a worm shaft K⁴ which is also mounted in suitable bearings upon the rack H.

Mounted in the bracket arms J and J', shown clearly in Figs. 2 and 3 of the drawings, which bracket arms are fastened to the rack H, are the vertically disposed rotatable shafts L and L', and to the shaft L is fixed a sprocket wheel M about which a chain M' passes, the rear ends of which are fastened to the eye-bolts M² secured to the rear bolster frame, said chain being shown clearly in Fig. 1 of the drawings. A sprocket wheel L² is fixed to the shaft L', and a sprocket chain L³ passes about said wheel L² and its ends are fastened to the eye-bolts L⁴ which are fastened to the forward bolster frame. A gear wheel O is fixed to the shaft L, and a gear wheel O' is fixed to the shaft L', and the two wheels O and O' intermesh, the latter being geared to the worm shaft K⁴.

Referring to Figs. 1 and 7 of the drawings, will be seen an angle lever N pivotally mounted upon the pin N' which is carried by the bracket arm upon the rack H, and an arm N² projecting from one end of said lever has its end forked and engages an annular groove in the shell I, as shown clearly in Figs. 3 and 7, and affords means whereby one or the other of said friction cones I' or I² may be thrown into engagement with the cone I³, accordingly as it may be desired to cause the front and the rear bolster to turn equal distances in either direction.

Fixed to a stub shaft Q mounted in suitable bearings upon the rack H is a finger Q', the forward end of which is slotted, as at Q², to receive one end of the lever N, and Q³ is a link which is pivotally connected at its forked end to said finger Q', while its other end is pivotally connected at Q⁴ to the lever Q⁵, which is mounted upon a stationary pivot Q⁶, and to the lever Q⁵ is pivotally connected a second operating lever Q⁷, which may extend up to any convenient location, whereby the operator of the machine may conveniently grasp the same to throw either one or the other of the friction cones I' or I² into contact with the cone I³.

Fixed to the forward end of the front bolster frame are the bracket arms W supporting the stub shaft W' upon which the drum or reel W² is journaled, and W³ is a gear wheel rotating with the reel, and Y designates a gear wheel which is splined to the shaft C⁶ and is adapted to be shifted upon said shaft by means of the lever Y', the forward forked end of which engages a groove in the shell which moves with the wheel Y, whereby the two wheels Y and W³ may be thrown into or out of gear. The reel W² is provided for the purpose of shifting the power from the shaft F' to cause the reel to rotate in one direction and about which a rope or cable may be wound, the other end of which is designed to be attached to a secure anchorage at the upper end of a hill or elevation, whereby means may be provided for pulling the vehicle in the event of the same not being able to propel the mechanism under ordinary circumstances.

In order to hold the gear wheels C constantly in mesh with the gear teeth upon the driven wheels A², I provide the springs Z, shown clearly in Fig. 1 of the drawings, which are mounted upon the screws Z' held in lugs projecting from the bolsters of the vehicle. Said springs are adapted to yield as the frame rises from the axle, and will have a tendency to take up any wear intermediate the wheels C and gear teeth with which they mesh, and in the event of any foreign matter getting between said wheels and teeth, the teeth will be allowed to ride over the obstruction and be drawn back into mesh by the springs.

The operation of my invention will be readily understood and is as follows. When the power is applied to the gear mechanism from the motor and the vehicle comes to a steep grade or when there is a resistance to the forward movement of the machine, the gears C turning upon the gear teeth within the driven wheels will have a tendency to raise the entire weight of the vehicle off the axles, thereby changing the center of gravity from a location directly under the center of the wheels, to positions in advance of the axles, thereby causing the power to be applied to the driven wheels in advance and above the points of contact between the driven wheels and the roadway. When the racks with the load of the vehicle rise to their limit, which is determined by the lower marginal edges of the apertured plates D³ and D⁴ coming in contact with the bottoms of the axles, which would be the case when the resistance to the onward movement of the vehicle exceeded the weight carried by the rack, the leverage incident to the pulling up of the marginal edges of said plates D³ and D⁴ against the lower edges of the axles, and the pulling down force of the gear wheels C against the teeth of the driven wheels A², would cause increased leverage upon the driven wheels, and by the application of power, the vehicle would be readily driven forward up the grade and over the sandy roads or whatever obstructions would cause the increased resistance.

In the event of one or the other of the front or rear wheels coming into contact with an obstruction, one wheel or the other of the front or rear pair would ride over the obstruction, without disturbing the wheels of the other pair, and by reason of the worm shaft being in engagement with the gear wheel O′, it will readily be seen that there will be no side sway to either sets of wheels. By the gear and chain connections, it will also be noted that when the forward wheels are turned in one direction or the other to change the course of the vehicle, the rear wheels will be caused to turn the same degree in order that they will follow the tracks of the forward wheels.

From the foregoing it will be noted that by the provision of the apparatus shown and described, a simple and efficient apparatus is afforded whereby the weight of the vehicle is thrown automatically off the axles and the center of gravity is shifted from the centers of the driven wheels to points in advance of the centers and adjacent to the marginal edges of the driven wheels in front of the two axles, where the pulling force is exerted in advance of the contact points between the driven wheels and the track or roadway.

What I claim is:—

1. In combination with the axles of a vehicle, driven wheels journaled thereon, gear teeth upon said wheels, a vehicle frame having elongated slots in plates forming a part of said frame and through which slots said axles are adapted to pass, the frame being designed to have a slight vertical movement independent of the axles, means for limiting the upward movement of the frame, shafts carried by the frame, and gear wheels fixed to said shafts and in mesh with the teeth of said driven wheels, as set forth.

2. In combination with the axles of a vehicle, driven wheels journaled thereon, gear teeth upon said wheels, a vehicle frame having elongated slots in plates forming a part of said frame and through which slots said axles are adapted to pass, the frame being designed to have a slight vertical movement independent of the axles, means for limiting the upward movement of the frame, shafts carried by the frame, gear wheels fixed to said shafts and in mesh with the teeth of said driven wheels, and guide means carried by the axles and adapted to prevent the frame from moving laterally as it rises and lowers, as set forth.

3. In combination with the axles of a vehicle, driven wheels journaled thereon, gear teeth upon said wheels, a vehicle frame having elongated slots in plates forming a part of said frame and through which slots said axles are adapted to pass, the frame being designed to have a slight vertical movement independent of the axles, means for limiting the upward movement of the frame, shafts carried by the frame, gear wheels fixed to said shafts and in mesh with the teeth of said driven wheels, and lugs projecting from the axles and between which the sides of the frame are adapted to be guided, as set forth.

4. In combination with the axles of a vehicle, driven wheels journaled thereon, gear teeth upon each of said wheels, front and rear bolster frames, connections between the same, slotted plates fixed to each bolster frame and adapted to receive said axles and to have a play independent of the axles, a driven shaft journaled in suitable bearings upon each bolster frame, and gear wheels fixed to said shaft and adapted to mesh with the gear teeth upon said driven wheels, as set forth.

5. In combination with the axles of a vehicle, driven wheels journaled thereon, gear teeth upon each of said wheels, front and rear bolster frames, connections between the same, slotted plates fixed to each bolster frame and adapted to receive said axles and to have a play independent of the axles, a driven shaft journaled in suitable bearings upon each bolster frame, gear wheels fixed to said shaft and adapted to mesh with the gear teeth upon said driven wheels, and means for causing the front and rear bolster frames to swing laterally the same distances, as set forth.

6. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, and means for causing the bolster frames to swing together in opposite directions, as set forth.

7. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, sprocket wheels mounted upon said rack, sprocket chains passing about said sprocket wheels, the ends of one chain being fixed to the forward bolster frame, and the ends of the other chain fastened to the rear bolster frame, and gear mechanism for causing said sprocket wheels to rotate together in opposite directions, as set forth.

8. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, sprocket wheels mounted upon said rack, sprocket chains passing about said sprocket wheels, the ends of one chain being fixed to the forward bolster frame, and the ends of the other chain fastened to the rear bolster frame, shafts to which said sprocket wheels are fixed, gear wheels fixed to the sprocket wheel carrying shafts and in mesh with each other, a worm shaft meshing with one of said intermeshing gear wheels, and means for driving said worm shaft in one direction or the other, as set forth.

9. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, sprocket wheels mounted upon said rack, sprocket chains passing about said sprocket wheels, the ends of one chain being fixed to the forward bolster frame, and the ends of the other chain fastened to the rear bolster frame, shafts to which said sprocket wheels are fixed, gear wheels fixed to the sprocket wheel carrying shafts and in mesh with each other, a worm shaft meshing with one of said intermeshing gear wheels, a friction cone, gear connections between the same and said worm shaft, a double friction cone carried by said rack, and means for throwing the same so that one or the other of the double friction cones will contact with said friction cone which is geared to said worm shaft, as set forth.

10. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, sprocket wheels mounted upon said rack, sprocket chains passing about said sprocket wheels, the ends of one chain being fixed to the forward bolster frame, and the ends of the other chain fastened to the rear bolster frame, shafts to which said sprocket wheels are fixed, gear wheels fixed to the sprocket wheel carrying shafts and in mesh with each other, a worm shaft meshing with one of said intermeshing gear wheels, a driven shaft, a shell mounted thereon, a double friction cone fixed to said shell, and lever mechanism for shifting said shell upon its shaft, whereby one or the other of said cones will frictionally contact with the cone which is geared to said worm shaft, as set forth.

11. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, a rack connecting said bolster frames, sprocket wheels mounted upon said rack, sprocket chains passing about said sprocket wheels, the ends of one chain being fixed to the forward bolster frame, and the ends of the other chain fastened to the rear bolster frame, shafts to which said sprocket wheels are fixed, gear wheels fixed to the sprocket wheel carrying shafts and in mesh with each other, a worm shaft meshing with one of said intermeshing gear wheels, a driven shaft, a shell mounted thereon, a double friction cone fixed to said shell, a pivotal angle lever adapted to engage an annular groove in said shell, a rock shaft, a finger fixed to said rock shaft and having a forked end adapted to engage said lever, and link and lever connections with said finger for tilting the angle lever, whereby said double drum may be shifted, as set forth.

12. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, two racks, one pivoted to each of said bolster frames and having swiveled connections with each other, whereby one bolster frame or the other may be tilted independent of the other, as set forth.

13. In combination with the axles of a vehicle apparatus, driven wheels journaled thereon, a front and a rear bolster frame, slotted plates fixed to said frames and adapted to receive said axles, series of gear teeth upon said driven wheels, shafts journaled in said frames, gear wheels fixed to said shafts and meshing with said gear teeth, two racks, one pivoted to each of said bolster frames, a disk fitted to the adjacent ends of said racks, one of said disks having grooved slots therein, and pins carried by the other disk and engaging said slots, as set forth.

14. In combination with the axles of a vehicle apparatus, driven wheels journaled thereon, series of gear teeth mounted upon each wheel, bolster frames mounted, one upon each axle, and adapted to have play independent of the axles, shafts carried, one by each bolster frame, gear connections between said shafts and gear teeth of the driven wheels, racks pivotally connecting said bolster frames, a rotatable shaft mounted in suitable bearings on one of said racks, shafts having knuckle jointed connections with said rack carrying shaft, and sprocket chain and wheel connections between said shafts which are carried by the bolster frames and the shafts carrying said gear wheels which are in mesh with the teeth of said driven wheels, as set forth.

15. In combination with the vehicle axles, hollow wheels journaled upon said axles, series of gear teeth mounted within each wheel, front and rear bolster frames supported one by each axle and adapted to have a play independent thereof, a shaft journaled in suitable bearings in each bolster frame, gear wheels fixed to said shafts and mounted to rotate each within a driven wheel and in mesh with the teeth therein, racks connecting said bolster frames, driving shafts, and gear connections between the same and said shafts carrying gear wheels within the driven wheels, as set forth.

In testimony whereof I hereunto affix my signature in the presence of two witnesses.

JAMES FORREST.

Witnesses:
A. L. HOUGH,
N. A. MAYHEW.